(12) United States Patent
Brewer et al.

(10) Patent No.: US 10,494,694 B2
(45) Date of Patent: Dec. 3, 2019

(54) METHOD FOR EXTRACTION AND SEPARATION OF RARE EARTH ELEMENTS

(71) Applicant: RARE EARTH SALTS SEPARATION AND REFINING, LLC, Minot, ND (US)

(72) Inventors: Joseph Brewer, Beatrice, NE (US); Ryan S. Winburn, Minot, ND (US); Joshua Beaudoin, Beatrice, NE (US)

(73) Assignee: RARE EARTH SALTS SEPARATION AND REFINING, LLC, Minot, ND (US)

( * ) Notice: Subject to any disclaimer, the term of this patent is extended or adjusted under 35 U.S.C. 154(b) by 0 days.

(21) Appl. No.: 15/503,954

(22) PCT Filed: Aug. 14, 2015

(86) PCT No.: PCT/US2015/045423
§ 371 (c)(1),
(2) Date: Feb. 14, 2017

(87) PCT Pub. No.: WO2016/025928
PCT Pub. Date: Feb. 18, 2016

(65) Prior Publication Data
US 2017/0275732 A1    Sep. 28, 2017

Related U.S. Application Data

(60) Provisional application No. 62/037,714, filed on Aug. 15, 2014.

(51) Int. Cl.
*C22B 3/06*    (2006.01)
*C01F 17/00*    (2006.01)
(Continued)

(52) U.S. Cl.
CPC ............... *C22B 3/06* (2013.01); *C01F 17/00* (2013.01); *C01F 17/0043* (2013.01); *C22B 3/44* (2013.01);
(Continued)

(58) Field of Classification Search
CPC ... C22B 3/06; C22B 3/44; C22B 59/00; C01F 17/0043; C01F 17/00; C25C 1/22; Y02P 10/234
See application file for complete search history.

(56) References Cited

U.S. PATENT DOCUMENTS 2,393,582 A    1/1946   Agnew
2,959,532 A *   11/1960   Fine .................... C25D 3/54
                                                    204/224 R
(Continued)

FOREIGN PATENT DOCUMENTS

SU           764414 A     12/1983
WO    2008137025 A1    11/2008

OTHER PUBLICATIONS

Taylor, Moddie D. "Preparation of Anhydrous Lanthanon Halides." Chemical Review. vol. 62 pp. 503-511. (Year: 1962).*

*Primary Examiner* — Tima M. McGuthry-Banks
(74) *Attorney, Agent, or Firm* — Milligan PC LLC (57) ABSTRACT

The present invention provides a method for recovery, extraction and separation of rare earth elements from rare earth containing materials such as ore and tailings. In accordance with preferred embodiments, the method of the present invention includes grinding rare earth-containing ores to form ore powder and leaching the powered ore with at least one mineral acid. Further, the method of the present invention includes forming a leach solution of metal ions, forming an aqueous-metal concentrate, and precipitating the aqueous-metal concentrate to selectively remove the metal ions from the leach solution. Further, the method of present (Continued)

invention includes the steps of obtaining a precipitate of the rare earth elements, mixing the precipitate with ammonium salt and subjected the mixture to an electrowinning process.

9 Claims, 3 Drawing Sheets

(51) Int. Cl.
  C25C 1/22     (2006.01)
  C22B 59/00    (2006.01)
  C22B 3/44     (2006.01)
  C25C 7/00     (2006.01)

(52) U.S. Cl.
  CPC .............. *C22B 59/00* (2013.01); *C25C 1/22* (2013.01); *C25C 7/00* (2013.01); *Y02P 10/234* (2015.11)

(56) References Cited

U.S. PATENT DOCUMENTS

| | | |
|---|---|---|
| 2,999,747 A | 9/1961 | Ronzio |
| 3,481,847 A | 12/1969 | Hine et al. |
| 3,880,651 A | 4/1975 | Queneau et al. |
| 3,891,741 A | 6/1975 | Carlin et al. |
| 3,922,231 A | 11/1975 | Carlin et al. |
| 3,923,616 A | 12/1975 | Atadan et al. |
| 5,518,703 A | 5/1996 | Dissaux et al. |
| 5,728,355 A | 3/1998 | Asada |
| 6,626,979 B2 | 9/2003 | Marsden et al. |
| 7,347,920 B2 | 3/2008 | Wu et al. |
| 8,221,609 B2 | 7/2012 | Fujita et al. |
| 8,263,028 B1 | 9/2012 | Vierheilig |
| 8,317,896 B2 | 11/2012 | Homma et al. |
| 8,524,176 B2 | 9/2013 | Thakur |
| 2011/0182786 A1 | 7/2011 | Burba |
| 2012/0205239 A1 | 8/2012 | Olguin et al. |
| 2013/0153435 A1 | 6/2013 | Sandoval et al. |
| 2013/0283977 A1 | 10/2013 | Lakshmanan et al. |
| 2014/0341790 A1* | 11/2014 | Kasaini ............ C22B 3/44 423/18 |

\* cited by examiner

METHOD FOR EXTRACTION AND SEPARATION OF RARE EARTH ELEMENTS

RELATED APPLICATIONS

The present application is a 371 of international application PCT/US 15/45423 filed Aug. 14, 2015, which claims priority to U.S. Provisional Application No. 62/037,714, filed Aug. 15, 2014.

BACKGROUND OF THE DISCLOSURE

Technical Field of the Disclosure

The present invention is related in general to recovery, extraction and/or separation of rare earth elements (REE), and in particular to a method and apparatus for extracting and separating rare earth elements from rare earth containing materials (e.g., ore, tailings or product of recycling).

DESCRIPTION OF THE RELATED ART

Rare earth elements principally include the lanthanide series of the periodic table, but the term can also incorporate scandium and yttrium. Exemplary rare earth elements, include: lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). Rare earth elements can include light rare earth elements, medium rare earth elements, and/or heavy rare earth elements. Exemplary light rare earth elements include La, Ce, Pr, Nd, and Pm. Exemplary medium rare earth elements include Sm, Eu, and Gd. Exemplary heavy rare earth elements include Sc, Tb, Dy, Ho, Er, Tm, Yb, Lu, and Y.

Rare earth elements that are recovered from ore/tailings can have a number of applications. For example, some of these ores/tailings contain Y, a heavy rare earth element that can be used in compact fluorescent light bulbs. The ores/tailings can also contain Nd, a light rare earth element that can be used in permanent magnet motors in hybrid vehicles, wind turbines, and computer disk drives. Other applications for rare earth elements can include, for example, use in aerospace components, high refractive index glass, flint, batteries, catalysts, polishes, lasers, x-ray machines and capacitors. The components containing rare earths utilized in these previously mentioned applications can also be recycled and the rare earths recovered from them.

A number of different methods and apparatuses have been suggested for the extraction of rare earth elements. Some of the currently used methods do not remove impurity fractions from the rare earth concentrate generated from the extraction and the plating process.

Based on the foregoing there is a need for an improved method and apparatus for extracting and separating rare earth elements from rare earth bearing ores and tailings.

SUMMARY OF THE DISCLOSURE

To minimize the limitations found in the prior art, and to minimize other limitations that will be apparent upon the reading of the specification, the preferred embodiment of the present invention provides a method for extracting and separating rare earth elements.

The present embodiment discloses a method for extracting and separating rare earth elements. The process starts with providing a rare earth bearing material (e.g., ore, tailing or product of recycling). The rare earth ore is leached with at least one mineral acid such as, nitric acid ($HNO_3$) or hydrochloric acid (HCl) to form a leach solution. The at least one mineral acid can be of any concentration with a pH of less than 1. The leach mixture contains the leach solution which includes at least rare earth ions and a solid material. The leach solution may also include at least one metal ion. For example, the at least one metal ion can include at least one aluminum ion, at least one zinc ion, at least one copper ion, at least one nickel ion, at least one titanium ion and/or at least one iron ion. The leach solution may be heated to improve the extraction of the rare earths from the rare earth bearing material.

The solid material is separated from the liquid/solid residue and a liquid-rare earth ion leachate solution is obtained. The solid material is removed as waste or for the recovery of the iron (Fe) or other materials by any desired process. The liquid-rare earth ion leachate solution is treated to recover the rare earth elements.

The at least one metal ion (e.g. iron) is precipitated from the leach solution by titrating leach solution with magnesium oxide (MgO) by adjusting the leach solution to a pH of about 1 to a pH of about 4. The liquid-rare earth concentrate is then treated by either oxalic acid addition to precipitate a rare earth oxalate concentrate or by titration to a pH of 7 by magnesium oxide or carbonate to generate a rare earth hydroxide or carbonate concentrate. The rare earth concentrate is precipitated from the rare earth leach solution as one or more insoluble rare earth compounds. For example, a rare earth bearing ore or tailings, such as monazite, is added to the at least one mineral acid, such as nitric acid. The ore or tailings and acid are mixed and heated to dissolve the rare earth bearing materials from the ore or tailings. The leachant solution impregnated with rare earths is separated from the solid rare earth depleted tailings or ore. The leachant solution is then titrated with MgO to precipitate out an insoluble transition metal compound such as iron phosphate or iron hydroxide. Then the appropriate amount of oxalate compound, such as oxalic acid or ammonium oxalate, can be added to precipitate a rare earth oxalate concentrate or the solution can be titrated to pH 7 by magnesium oxide or magnesium carbonate to precipitate out a rare earth hydroxide or carbonate concentrate.

In another embodiment, the rare earth ore, such as ionic clay, is added to an at least one mineral acid solution containing an oxalate compound such as ammonium oxalate. The solution is stirred and the rare earth depleted ionic clay is separated from the rare earth impregnated solution. The rare earth impregnated solution is then titrated with magnesium oxide or other base to produce a rare earth oxalate concentrate which may contain other metal other than rare earths in high concentration.

The precipitated rare earth concentrate produces rare earth oxalates and is then heated in air (calcined) to at least 350° C. to produce oxide of rare earth concentrate. For example, after the precipitation of the at least one metal ion, the rare earth elements can be insolubilized out of the solution and can be found as an ion associated to an hydroxide or a salt or hydrates thereof.

After the rare earth concentrate precipitation, magnesium nitrate ($Mg(NO_3)_2$) is removed from solution by evaporation of the water component. The magnesium nitrate ($MgNO_3$) is then thermally decomposed by raising the temperature of the salt to form magnesium oxide (MgO) and gaseous nitric oxides ($NO_X$). The nitricoxides ($NO_X$) are then bubbled through water to regenerate the nitric acid ($HNO_3$). The nitric values are removed, leaving the magnesium oxide (MgO). The regenerated nitric acid is recycled to the leaching step for further use.

The rare earth oxide concentrate is mixed with an ammonium salt, for example ammonium chloride, ammonium bromide or ammonium iodide at a ratio ranging from 1:0.5 (oxide:ammonium salt) to 1:10 with the optimal conditions being between 1:2 and 1:4. The mixture is heated at a temperature between 200° C. and 250° C. in dry air or nitrogen flow until there is no more apparent color change in the material. Preferably, the temperature is approximately 200° C. The temperature is then increased to 250° C. to 350° C. under dry air or nitrogen with mixing until the sublimation of the excess ammonium salt is complete. The resulting material is a mixture of anhydrous rare earth salts. The anhydrous rare earth salts are utilized as provided in an aqueous solution for the separations process. Non-soluble materials from the conversion are typically transition metal impurities in the rare earth concentrate.

The rare earth elements are separated from the aqueous solution by means of an electrowinning process using a sacrificial anode. As used herein, the term "electrowinning process" refers to an electrodeposition of metals from solutions containing the metals onto a plate or wire mesh thereby allowing purification of a metal. A potential is applied between a cathode and the sacrificial anode. Preferably, the cathode is a relatively inert metal, such as steel or molybdenum. Preferably, the sacrificial anode is aluminum. The potential is then varied to increasing potentials to allow the sequential deposition of the rare earth elements. The potential used can vary from an electrolytic cell to over 1.0V, for example, with a typical range between 0.1V and 0.7V. The initial electrode position occurs at approximately 0.2V and yields a material that is dominated by scandium and heavy rare earth elements. Temperature may also be adjusted from 1° C. to 35° C. to facilitate the separations process. The electrowinning process may be accomplished in any number of cell configurations, including a single cell with no junctions or a cell with one or more liquid junctions such as, salt bridges or membrane.

For example, a cell with multiple junctions would be a cell in which the anode and cathodes are alternated and separated by an anion membrane. The anodic half cells with the aluminum plates are defined as aluminum cells and contain a sodium chloride aqueous solution ranging from 0M to saturated or the same sodium chloride solution with aluminum chloride ranging from 0.001 to 1M. The cathodic half cells with the inert metal plates contain the rare earth salt aqueous solution. Preferably, the inert metal plates are steel or molybdenum. The membranes prevent migration of cations and water between the rare earth elements and aluminum cells. However, the membrane allows movement of anions, such as chloride, bromide, iodide or nitrate, and hydrogen ions.

A rare earth plating process is facilitated by the oxidation of the aluminum plates into the aqueous sodium chloride solution. As an aluminum ion forms and dissociates into the solution in the aluminum cell, a rare earth element is reduced and deposited in the corresponding rare earth cell. As the rare earth element is deposited out, the anions diffuse through the membrane and complex with the aluminum ions in the aluminum cell to maintain the appropriate charge balance. The plated material spontaneously oxidizes and is then removed from the electrode and processed through the rare earth oxide concentrate to salt conversion process.

The plated material is thermally treated with an ammonium salt in between iterations. The solution containing the remaining rare earth ions from the iterations is added back into either a main heavy rare earth ion depleted feed stream or a purification stream for a second rare earth element to be separated, depending on the composition on the solution. The heavy rare earth depleted solution from the original electrodeposition is then passed into a second cell for the separation of the next rare earth element in the sequence. The process of separation and purification is continued for each of sixteen rare earth elements of interest, for example, lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). The potential of each separation cell is optimized to yield the rare earth element of interest plus one to two major impurity elements. The purifying cells are then used to concentrate the rare earth element of interest while minimizing the amount of the impurity elements.

In one embodiment, a method for extracting and separating rare earth elements is disclosed. Initially, a rare earth-containing ore or tailings is provided and the rare earth-containing ore or tailings is processed to sub-60 mesh utilizing mechanical grinding to form powdered ore. The powdered ore is leached using a mineral acid, for example, nitric acid ($HNO_3$) to form a leach solution having at least one metal ion, rare earth elements and a solid material. The leaching process is followed by a liquid-solid separation step in which the solid material is separated from the leach solution to form aqueous rare earth concentrate. The aqueous rare earth concentrate is precipitated to selectively remove the at least one metal ion from the leach solution and obtain a precipitate of the rare earth elements in the form of rare earth oxalates. The precipitate of the rare earth elements or rare earth oxalates is heated in air to form an oxide of the rare earth elements. The rare earth oxide is mixed with an ammonium salt and heated in a dry air/nitrogen at a rare earth conversion step. A mixture of anhydrous rare earth salts is formed and is provided in an aqueous solution. Finally, the rare earth elements are separated from the aqueous solution by means of an electrowinning process. During the electrowinning process the rare earth elements are plated from the aqueous solution using a sacrificial anode and are removed as oxidized rare earth compounds.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
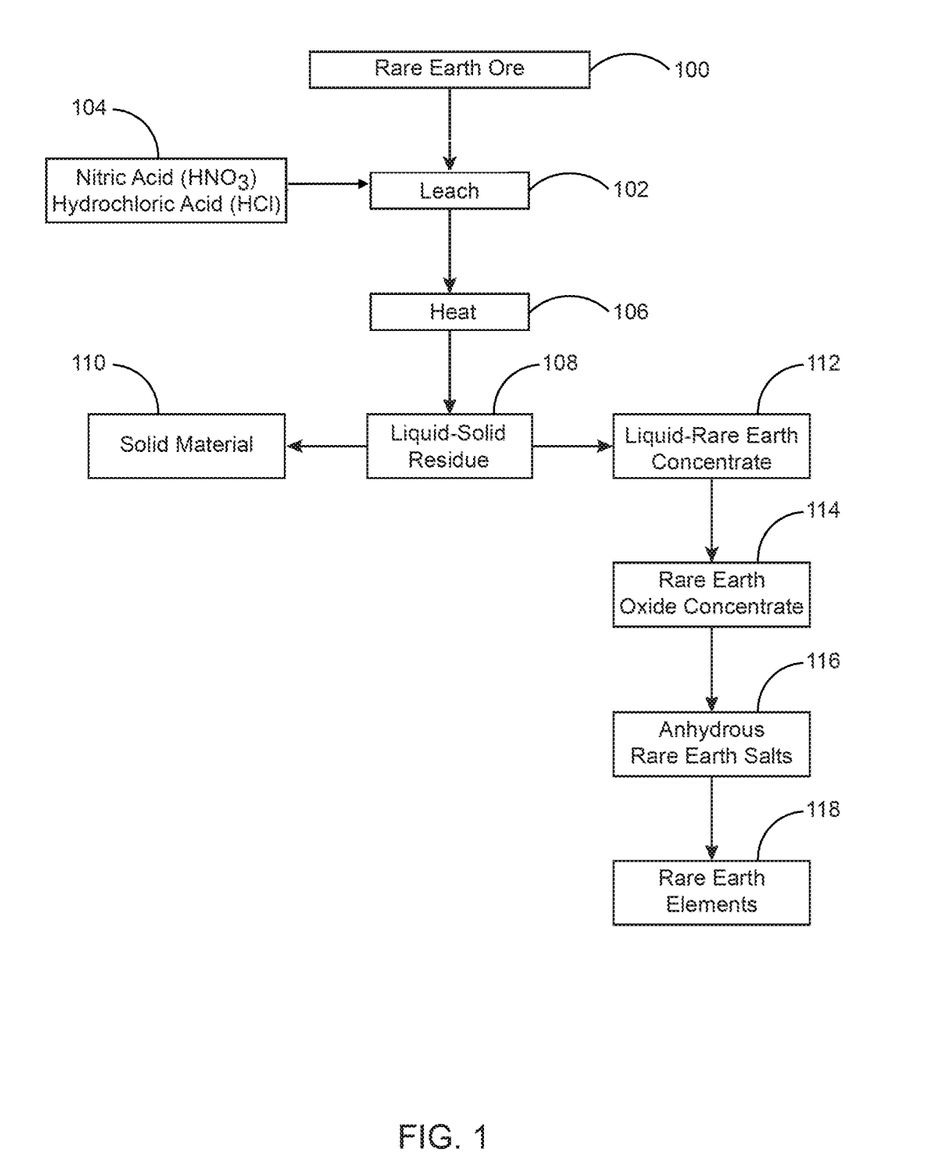
FIG. 1 is a basic schematic flow diagram of a method for extracting and separating rare earth elements in accordance with the preferred embodiment of the present invention.

FIG. 1 is a basic schematic flow diagram of a method for extracting and separating rare earth elements. The process starts with providing a rare earth bearing material (e.g., ore, tailings or product of recycling). The rare earth ore or tailings 100 is leached 102 with at least one mineral acid such as, nitric acid ($HNO_3$) or hydrochloric acid (HCl) 104 to form a leach solution. The at least one mineral acid can be any concentration with a pH less than 1. The at least one mineral acid used for leaching the rare earth ore can be HCl, $H_2SO_4$, $HNO_3$ or mixtures thereof. More than one acid can be used as a mixture or separately. Solutions made with these acids can be used at various concentrations. A rare earth chelating agent such as an oxalate compound may also be added to the leaching acid prior to the addition of the rare earth bearing ore/tailings. The rare earth ore 100 may be stockpiled for processing, or they may be blended with other ores, metallurgical wastes, or other rare earth-bearing materials. When required, the ores are ground or powdered or reduced in size to effectively dissolve the ore in the at least one mineral acid during the leaching step 102.

The leach solution includes at least one rare earth 118 and a solid material 110. The leach solution may also contain at least one metal ion. For example, the at least one metal ion can include at least one aluminum ion, at least one zinc ion, at least one copper ion, at least one nickel ion, at least one titanium ion and/or at least one iron ion. The leach solution is optionally heated 106 to form a liquid/solid residue 108. The leaching step 102 and heating step 106 can be carried out in the same vessel, or in separate vessels.

The solid material 110 is separated from the liquid/solid residue 108 and an aqueous-rare earth concentrate 112 is formed. The solid material 110 is removed for the recovery of the iron (Fe) or other materials by any desired process.

The aqueous-rare earth concentrate 112 is treated to recover the rare earths 118.

Figure 2:
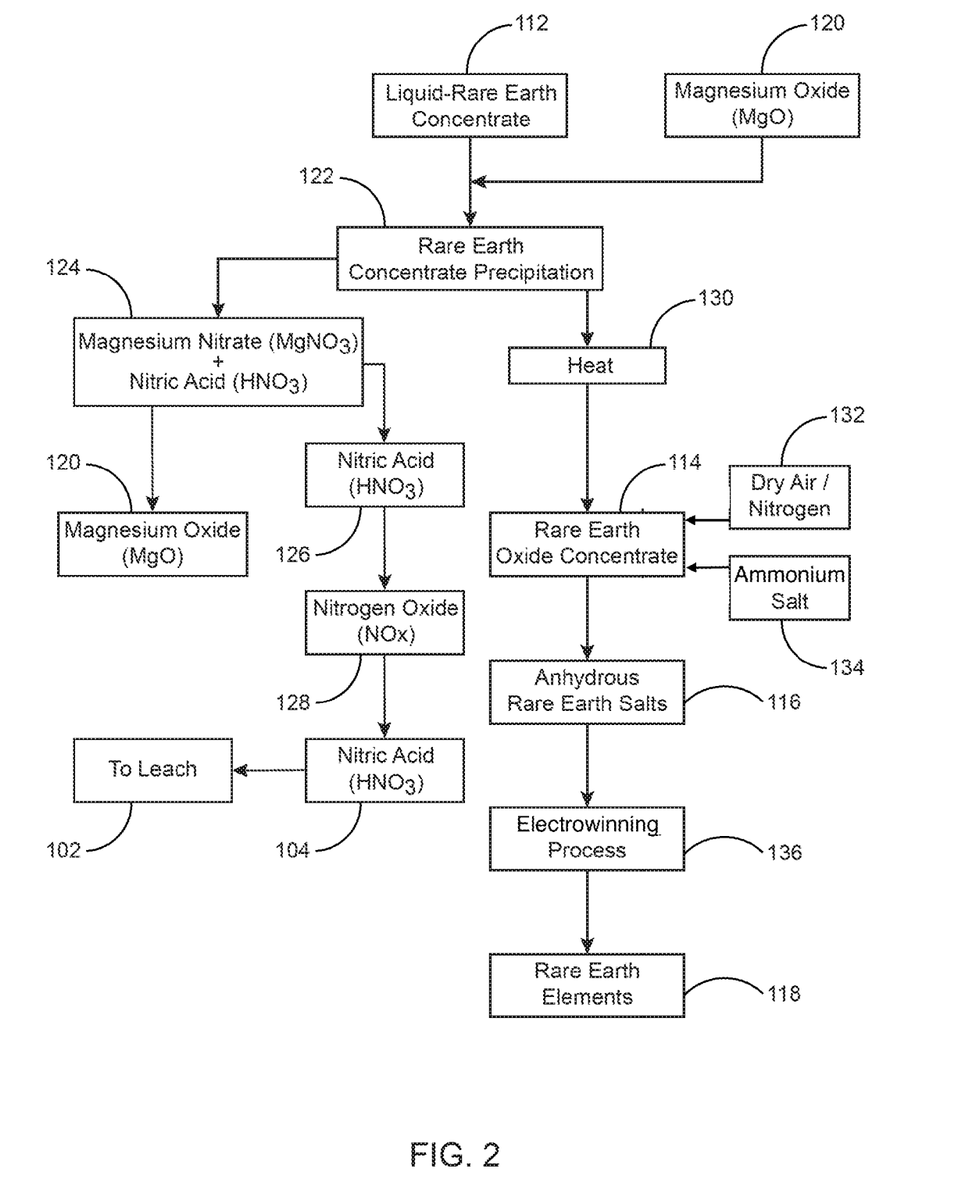
FIG. 2 is a schematic flow diagram for recovering rare earth elements from an aqueous, rare earth concentrate in accordance with the preferred embodiment of the present invention.

As shown in FIG. 2, the at least one metal ion is optionally precipitated 122 from the leach solution by titrating leach solution with magnesium oxide (MgO) 120 by adjusting the leach solution to a pH of about 1 to a pH of about 4. The precipitate is separated via filtration, centrifuge or decanting centrifuge. The aqueous-rare earth concentrate 112 is then treated with either the appropriate oxalate bearing compound to precipitate out a rare earth oxalate concentrate or basic magnesium compound to pH 7 to precipitate out a rare earth hydroxide or carbonate concentrate.

The precipitated rare earth concentrate 122 produces rare earth oxalates, hydroxides or carbonates and is then heated at 130 in air (calcined) to at least 350° C. or hotter to produce oxide of rare earth concentrate at 114. For example, after the precipitation 122 of the at least one metal ion, the rare earths 118 can be insolubilized from the solution and can be found as an ion associated to an hydroxide or a salt or hydrates thereof.

After the rare earth concentrate precipitation at 122, magnesium nitrate ($Mg(NO_3)_2$) solution is heated at 124 to remove the water. The magnesium nitrate ($Mg(NO_3)_2$) 124 is then thermally decomposed by raising the temperature of the salt to form magnesium oxide (MgO) and gaseous nitric oxides ($NO_X$) at 120 and 128 respectively as shown in FIG. 2. The nitric oxides ($NO_X$) 128 are then bubbled through water to regenerate the nitric acid ($HNO_3$) at 104. The nitric values 126 are removed, leaving the magnesium oxide (MgO) 120. The removed nitric acid 126, with nitric oxides ($NO_X$) 128 added, as necessary, is recycled to the leaching step 102 or to the nitric acid 104 recycle process for further use.

The rare earth oxide concentrate 114 is mixed with an ammonium salt 134 such as for example ammonium chloride, ammonium bromide or ammonium iodide at a ratio ranging from 1:0.5 (oxide:ammonium salt) to 1:10 with the optimal conditions being between 1:1 and 1:2. The mixture is heated at a temperature between 200° C. and 250° C. in dry air or nitrogen flow until there is no more apparent color change in the material. Preferably, the temperature is approximately 200° C. The temperature is then increased to 250° C. to 350° C. under dry air or nitrogen 132 with mixing until the sublimation of the excess ammonium salt 134 is complete. The resulting material is a mixture of anhydrous rare earth salts 116. The anhydrous rare earth salts 116 are utilized as provided in an aqueous solution.

In one embodiment, the ammonium from the conversion process is bubbled through hydrochloric acid (HCl) to regenerate ammonium chloride. The excess ammonium chloride is condensed out of the gas phase for recovery and is reused in the rare earth conversion process.

The rare earths 118 are separated from the aqueous solution by means of an electrowinning process 136 using a sacrificial anode. As used herein, the term "electrowinning" refers to an electrodeposition of metals from their ores onto a plate or wire mesh thereby allows purification of a non-ferrous metal. A potential is applied between a cathode and the sacrificial anode. Preferably, the cathode is a relatively inert metal, such as steel or molybdenum. Preferably, the sacrificial anode is aluminum. The potential is then varied to increasing potentials to allow the sequential deposition of the rare earth elements 118. The potential used can vary from an electrolytic cell to over 1.0V, for example, with a typical range between 0.2V and 0.7V. The initial electrode position occurs at approximately 0.2V and yields a material that is dominated by scandium and heavy rare earth elements. Temperature may also be adjusted from 1° C. to 35° C. to facilitate the separations process. The electrowinning process 136 may be accomplished in any number of cell configurations, including a single cell with no junctions or a cell with one or core liquid junctions (salt bridges or membrane).

For example, a cell with multiple junctions would be a cell in which the anode and cathodes are alternated and separated by an anion membrane. The anodic half cells with the aluminum plates is defined as aluminum cells and contains a sodium chloride aqueous solution ranging from 0-M to saturated or the same sodium chloride solution with aluminum chloride ranging from 0.001 to 1M. The cathodic half cells with the inert metal plates contain the rare earth salt aqueous solution. Preferably, the inert metal plates are steel or molybdenum. The membranes prevent migration of cations and water between the rare earth 118 and aluminum cells. However, the membrane allows movement of anions, such as chloride, bromide, iodide or nitrate, and hydrogen ions.

A rare earth plating process is facilitated by the oxidation of the aluminum plates into the aqueous sodium chloride solution. As an aluminum ion forms and dissociates into the solution in the aluminum cell, a rare earth element 118 is reduced and deposited in the corresponding rare earth cell. As the rare earth element 118 is deposited out, the anions diffuse through the membrane and complex with the aluminum ions in the aluminum cell to maintain the appropriate charge balance. The plated material spontaneously oxidizes and is then processed through the rare earth oxide concentrate to salt conversion process as illustrated in FIG. 2. This process is repeated for a total of 10-30 iterations to produce a 99.9% pure rare earth element 118, mostly an oxide of the rare earth element 118. The plated material is thermally treated with ammonium salt in between the iterations. The solution containing the impurity elements formed from the iterations is added back into either a main heavy rare earth depleted feed stream or a purification stream for a second rare earth element to be separated, depending on the composition on the solution. The heavy rare earth depleted solution from the original electrodeposition is then passed into a second cell for the separation of the second rare earth element in the sequence. The process of separation and purification is continued for each of the sixteen rare earth elements 118 of interest, for example, lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). The potential of each separation cell is optimized to yield the rare earth element(s) 118 of interest plus several other major impurity elements depending on the iteration. The purifying cells are then used to concentrate the rare earth element 118 of interest while minimizing the amount of the impurity elements.

Figure 3:
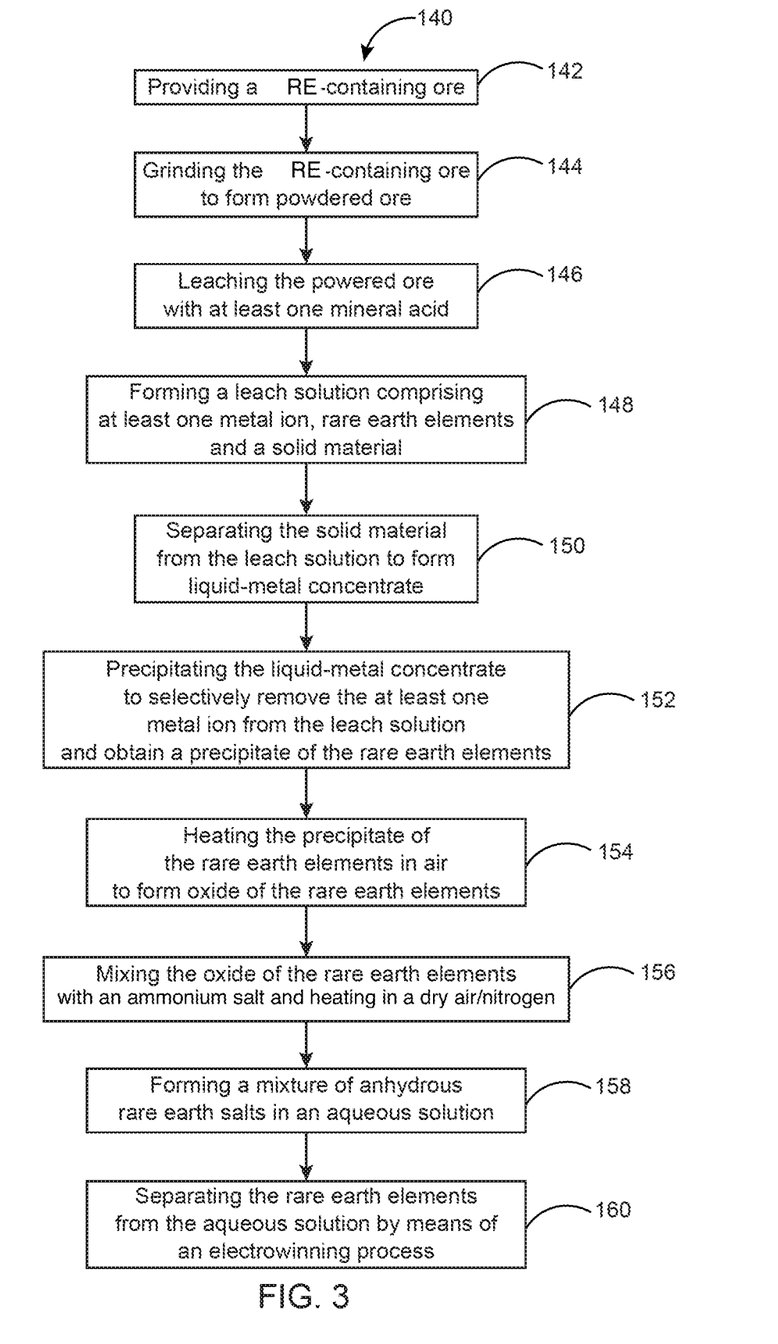
FIG. 3 is a flowchart illustrating a method for extracting and separating rare earth elements in accordance with the preferred embodiment of the present invention.

FIG. 3 is a flowchart illustrating a method 140 for extracting and separating rare earth elements in accordance with the preferred embodiment of the present invention. Initially, a rare earth-containing (RE-containing) ore/tailings is provided as indicated at block 142. The rare earth-containing ore/tailings is processed to sub 60 mesh utilizing mechanical grinding to form powdered ore as indicated at block 144. The grinding step 144 is followed with a leaching step as indicated at block 146.

Leaching step 146 can be any method, process, or system that enables a rare earth element to be leached from a rare earth containing material. Typically, the leaching step 146 utilizes an acid to leach a rare earth element from a rare earth containing material. For example, leaching step 146 can employ a leaching apparatus such as for example, a heap leach, a vat leach, a tank leach, a pad leach, a leach vessel or any other leaching technology useful for leaching a rare earth element from a rare earth containing material. In accordance with various embodiments, leaching step 146 may be conducted at any suitable pressure, temperature, and/or oxygen content. Leaching step 146 can employ one of a high temperature, a medium temperature, or a low temperature, combined with one of high pressure, or atmospheric pressure. Leaching step 146 may utilize conventional atmospheric or pressure leaching, for example but not limited to, low, medium or high temperature pressure leaching. As used herein, the term "pressure leaching" refers to a rare earth element recovery process in which the rare earth containing material is contacted with an acidic solution and oxygen under conditions of elevated temperature and pressure.

In accordance with a preferred embodiment of the present invention, the leaching step 146 preferably includes a mineral acid, for example, nitric acid ($HNO_3$). In one embodiment, the mineral acid is hydrochloric acid (HCl). In some embodiments, the mineral acid is selected based on a specific application for the rare earth elements. The concentration and quantity of the nitric acid or hydrochloric acid depend on the metal-containing ore. In these embodiments, the concentration of mineral acid is such that the pH is less than 1. In steps 144 and 146, there is no crushing and separating of the metal-containing ore into valuable substances or waste.

The leaching step 146 provides a leach solution comprising at least one metal ion, rare earths and a solid material as indicated at block 148. The leaching step 146 is followed by a liquid-solid separation step in which the solid material is separated from the leach solution to form aqueous-metal concentrate as indicated at block 150. The aqueous-metal concentrate can be precipitated to selectively remove the at least one metal ion from the leach solution and obtain a precipitate of the rare earth elements in the form of rare earth oxalates or hydroxides as indicated at block 152. The precipitate of the rare earth hydroxides or rare earth oxalates is heated in air to form an oxide of the rare earth elements as indicated at block 154. The rare earth oxide is mixed with an ammonium salt and heated in a dry air/nitrogen at a rare earth conversion step as indicated at block 156. A mixture of anhydrous rare earth salts is formed and is provided in an aqueous solution as indicated at block 158. Finally, the rare earth elements are separated from the aqueous solution by means of an electrowinning process as indicated at block 160. During the electrowinning process 160 the rare earth elements are plated from the aqueous solution using a sacrificial anode.

In another embodiment, the rare earths 118 are extracted from rare earth bearing ores 100 and tailings. The extraction process can be used for the recovery of rare earth elements 118 from industrial products such as magnets or phosphors. The leaching step 102 includes any concentration of acid. The rare earth elements 118 are removed from the nitric acid 104 leach solution by titration with magnesium oxide (MgO) 120 and the pH adjusted solution is then spray dried to recover the magnesium nitrate ($Mg(NO_3)_2$) 124 to MgO 120 and nitric oxide ($NO_x$) 128. The nitric oxide ($NO_x$) 128 is then bubbled through water to recover the acid.

In an embodiment, the rare earth elements 118 are in a solid solution or concentrate instead of individual rare earth elements. The time is decreased from 10 hours per Gerd Meyer process to 6 hours and temperature is decreased from 230° C. to 200° C. In this embodiment, the rare earth conversion step is run under dry air/nitrogen 132 instead of dynamic vacuum as water causes the oxidation of the rare earth chloride to an oxychloride. The method is used to remove impurity fractions from the liquid-rare earth concentrate 112 generated from the extraction and the plating process. In this embodiment the excess ammonium chloride is condensed out of the gas phase for recovery and reuse. The ammonia gas is bubbled through water to recover and is reacted with HCl to regenerate ammonium chloride and is reused in the rare earth conversion process.

The person skilled in the art will thus understand that the processes of the present disclosure can be used in combination with various processes for treating metal-bearing materials. In fact, various different treatments can be carried out to the metal-bearing materials in the processes of the present disclosure including recovery of at least one rare earth element.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

We claim:

1. A method for extracting rare earth elements from rare earth containing ore, the method comprising the following steps:
    grinding the rare earth-containing ore to form powdered ore;
    leaching the powdered ore with at least one mineral acid to form a leaching solution comprising at least one rare earth element and a solid material;
    separating the solid material from the leaching solution;
    adding oxalic acid to the leaching solution to precipitate a rare earth oxalate concentrate;
    heating the rare earth oxalate concentrate in air to form an oxide of the rare earth concentrate;
    mixing the oxide of the rare earth concentrate with an ammonium salt and heating in air to form anhydrous rare earth salts;
    forming a mixture of the anhydrous rare earth salts in an aqueous solution;
    separating the rare earth elements from the aqueous solution by an electrowinning process; and
    removing at least one metal ion from the leach solution;
    wherein the step of removing at least one metal ion from the leaching solution further comprises titrating with magnesium oxide (MgO).

2. The method of claim 1, wherein the step of removing at least one metal ion from the leaching solution further comprises titrating with magnesium oxide (MgO) to a pH of 4.

3. A method for extracting rare earth elements from ore material containing rare earth elements, the method comprising the following steps:
    leaching the ore material with a mineral acid solution, wherein the mineral acid solution comprises an oxalate compound; wherein the oxalate compound comprises ammonium oxalate;
    stirring the mineral acid solution to deplete the rare earth elements from the ore material;
    separating the depleted ore material from the mineral acid solution;
    titrating the mineral acid solution with a base to produce a rare earth oxalate concentrate;
    removing at least one metal ion from the rare earth oxalate concentrate;
    adding oxalic acid to the rare earth oxalate concentrate;
    heating the rare earth oxalate concentrate in air to form an oxide of the rare earth concentrate;
    mixing the oxide of the rare earth concentrate with an ammonium salt and heating to form anhydrous rare earth salts;
    forming a mixture of anhydrous rare earth salts in an aqueous solution; and
    separating the rare earth elements from the aqueous solution by an electrowinning process.

4. A method for extracting rare earth elements from ore material containing rare earth elements, the method comprising the following steps:
    leaching the ore material with a mineral acid solution, wherein the mineral acid solution comprises an oxalate compound;
    stirring the mineral acid solution to deplete the rare earth elements from the ore material;
    separating the depleted ore material from the mineral acid solution;
    titrating the mineral acid solution with a base to produce a rare earth oxalate concentrate; wherein the base is comprised of magnesium oxide;
    removing at least one metal ion from the rare earth oxalate concentrate;
    adding oxalic acid to the rare earth oxalate concentrate;
    heating the rare earth oxalate concentrate in air to form an oxide of the rare earth concentrate;
    mixing the oxide of the rare earth concentrate with an ammonium salt and heating to form anhydrous rare earth salts;
    forming a mixture of anhydrous rare earth salts in an aqueous solution; and
    separating the rare earth elements from the aqueous solution by an electrowinning process.

5. A method for extracting rare earth elements from rare earth containing ore, the method comprising the following steps:
    grinding the rare earth-containing ore to form powdered ore;
    leaching the powdered ore with at least one mineral acid to form a leaching solution comprising at least one rare earth element and a solid material;
    separating the solid material from the leaching solution;
    titrating the leaching solution with magnesium oxide (MgO) to precipitate a rare earth oxalate concentrate;
    heating the rare earth oxalate concentrate in air to form an oxide of the rare earth concentrate;
    mixing the oxide of the rare earth concentrate with an ammonium salt and heating in air to form anhydrous rare earth salts;
    forming a mixture of the anhydrous rare earth salts in an aqueous solution;
    separating the rare earth elements from the aqueous solution by an electrowinning process; and
    removing at least one metal ion from the leach solution.

6. The method of claim 5, wherein the leaching solution is titrated to a pH of 4.

7. The method of claim 5, wherein the leaching solution is titrated to a pH of 7 to generate a rare earth hydroxide.

8. A method for extracting rare earth elements from rare earth containing ore, the method comprising the following steps:
    grinding the rare earth-containing ore to form powdered ore;
    leaching the powdered ore with at least one mineral acid to form a leaching solution comprising at least one rare earth element and a solid material;
    separating the solid material from the leaching solution;
    titrating the leaching solution with carbonate to generate a carbonate concentrate;
    heating the carbonate concentrate to form an oxide of the rare earth concentrate;

mixing the oxide of the rare earth concentrate with an ammonium salt and heating in air to form anhydrous rare earth salts;

forming a mixture of the anhydrous rare earth salts in an aqueous solution;

separating the rare earth elements from the aqueous solution by an electrowinning process; and removing at least one metal ion from the leach solution.

9. The method of claim 8, wherein the leaching solution is titrated to a pH of 7 to generate the carbonate concentrate.

* * * * *